(12) United States Patent
Gelin

(10) Patent No.: US 8,671,023 B2
(45) Date of Patent: Mar. 11, 2014

(54) CLICK-TO-CALL WEB ADVERTISING

(76) Inventor: Jimmy Gelin, Willingboro, NJ (US)

( * ) Notice: Subject to any disclaimer, the term of this patent is extended or adjusted under 35 U.S.C. 154(b) by 270 days.

(21) Appl. No.: 13/084,571

(22) Filed: Apr. 12, 2011

(65) Prior Publication Data

US 2012/0265620 A1    Oct. 18, 2012

(51) Int. Cl.
*G06Q 30/00* (2012.01)

(52) U.S. Cl.
USPC .................. 705/14.73; 705/14.48; 705/14.4

(58) Field of Classification Search
USPC ....................................... 705/14.73
See application file for complete search history.

(56) References Cited

U.S. PATENT DOCUMENTS

| | | | |
|---|---|---|---|
| 5,838,682 A * | 11/1998 | Dekelbaum et al. | 370/401 |
| 6,366,914 B1 * | 4/2002 | Stern | 1/1 |
| 6,393,015 B1 * | 5/2002 | Shtivelman | 370/352 |
| 2004/0193488 A1 * | 9/2004 | Khoo et al. | 705/14 |

OTHER PUBLICATIONS

Berners-Lee, "Hypertext Markup Language—2.0", Request for Comments No. 1866, Network Working Group, Nov. 1995, archived by the Internet Engineering Task Force and available on line at ietf.org.*
Yang, Yahoo! home page as of Apr. 18, 1997, retrieved from the Internet Archive Wayback Machine at archive.org.*
Oettinger, "Despite Full Banner Popularity, Other Ad Formats Account for Majority of Online Impressions and Garner Greater Exposure, Reports AdRelevance Unit of Jupiter Media Matrix", AdRelevance, Jupiter Media Matrix, Nov. 6, 2000.*

* cited by examiner

*Primary Examiner* — John G Weiss
*Assistant Examiner* — Scott C Anderson
(74) *Attorney, Agent, or Firm* — Sughrue Mion, PLLC

(57) ABSTRACT

A novel and simple interactive web advertising method. A Click to Call feature is placed together with a web advertising message. A viewer may input a phone number and submit it by clicking a submitting button, and the input phone number is then submitted to the hosting server for subsequent actions either by the advertising agency or the advertiser. The web advertising message may be in any form, for example, in banner display, in web link description or boxed text advertising.

8 Claims, 2 Drawing Sheets

CLICK-TO-CALL WEB ADVERTISING

BACKGROUND OF THE INVENTION

1. Field of the Invention

The present application relates to internet advertising, and more particularly to a banner advertising that includes a form for a viewer to submit his phone number to receive a callback.

2. Description of Related Art

It is always an advertiser's dream to receive a feedback from a potential customer. The internet has made interactive advertising ever so easier. However, most of the interactive internet advertising requires interested viewers to click to another webpage to fill a form, the viewers usually need to provide a long list of personal information before being able to send the form out. For example U.S. 2010/0312647 A1 patent application teaches a method of providing viewer information interactively through plurality of webpages associated with a banner advertisement.

It may be easier for automatic content filling, for example, as disclosed in U.S. 2010/0031163 A1 patent application, where pages of personal information may be filled automatically, the advertising programs need to be developed in a complicated, self-executory way, which may not be affordable for small business owners.

A simple yet efficient interactive advertising is needed.

SUMMARY OF THE INVENTION

The present application discloses a novel "click to call" featured design for constructing interactive banner advertising.

In one aspect of an embodiment, an input form just for entry of a telephone number of an interested viewer is placed together with the advertisement message and a "Call Me" button is placed together with the form to submit the request for a call.

In another aspect of an embodiment, an advertising agent responsible for placing the banner ads receives the request for call from a viewer, and forwards the request to its client.

In another aspect of an embodiment, the client of the banner advertising directly receives the request for call.

In another aspect of an embodiment, the advertising agent responsible for the placing the banner ads has the option to select who would receive the request to call phone number.

The disclosed innovation, in various embodiments, provides the easiest and simple method for implementing an interactive banner advertising with minimal programming requirement.

In an exemplary embodiment of the present invention, when an ad viewer enters his/her phone number into an input box which is displayed on an ad, the phone number is both collected and is also dialed to the specific advertiser or to a client of the owner of the ad. The owner of the ad will be using a click to call developers system such as Ifbyphone.com® to route the phone call between the ad viewer who put his/her phone number into the input box on the ad. Once the ad viewer enters his/her number in the input box and hits the submit button, a "CALL ME" button on the ad., the ad viewer's phone number will be dialed from a third party and connected to the advertiser's phone number or the advertiser's number will be dialed by a third party and then connected to the ad viewer's phone number that was entered into the input box. Thus, an ad viewer enters his or her phone number into a display advertisement. After clicking on a submit box in the ad, and using the click to call developers system such as Ifbyphone.com®, a third party will initialize a call between the advertiser and the ad viewer.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
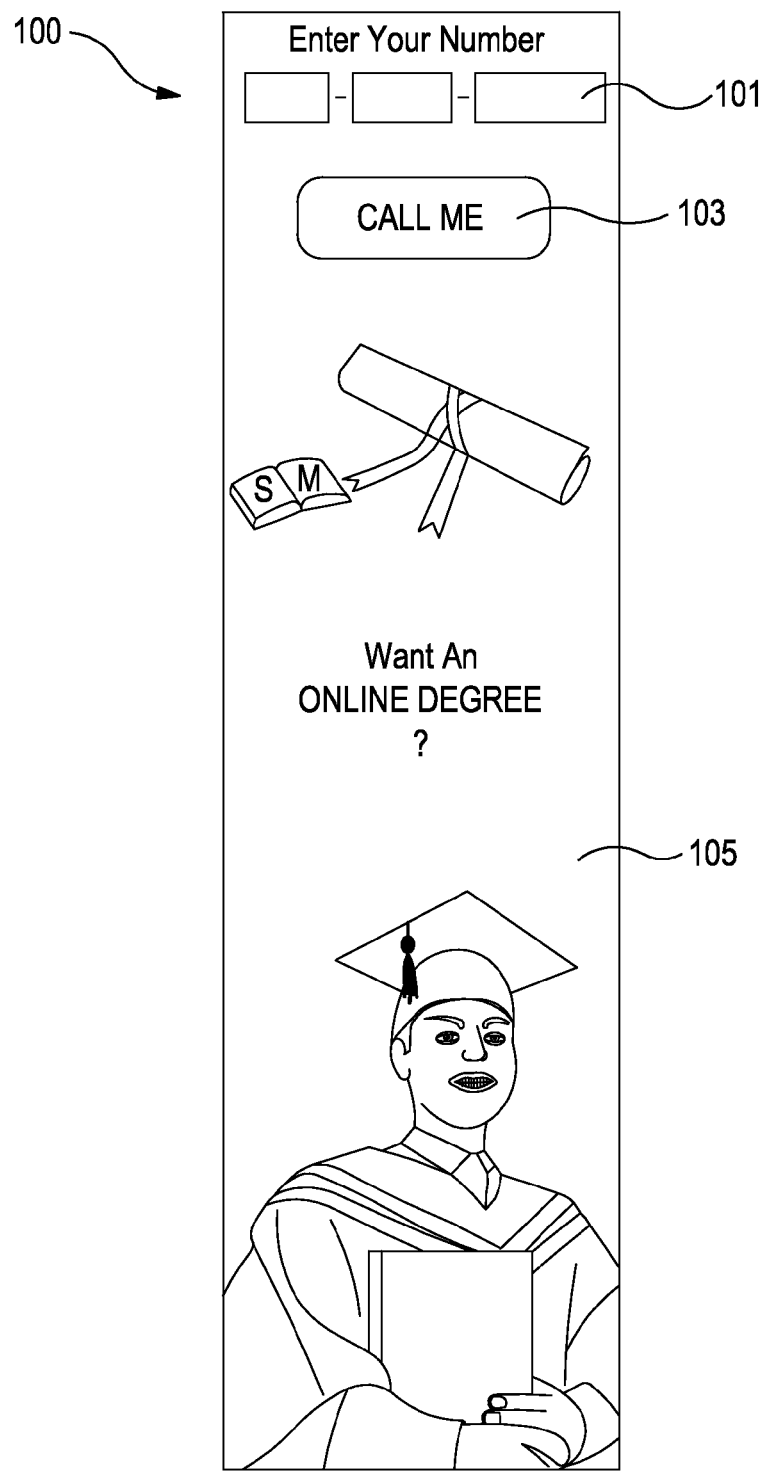
FIG. 1 shows an example banner advertising in accordance with the principles of the invention.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

A "click to call" feature allows a viewer to submit a phone number for an advertiser to call back for further interaction. It is contemplated and intended that such feature may be included in any form of web advertising, for example, in text advertising and web-link advertising, a "click to call" feature may be includes in the advertising text of a web link. However, for clarity reason, the given example is in a web banner advertisement form.

In reference to FIG. 1, a banner advertisement 100 on its first page includes an advertisement section 105 and a simple input field 101 for an interested viewer to input its phone number for a call back. When a person viewing an advertisement on the internet is interested in talking to the advertiser of an ad he/she is viewing, he/she enters his/her phone number into the phone number box 101 and then hits the submit button, the "CALL ME" box 103. As soon as the ad. viewer enters his/her phone number in the input fields and hits the submit button, the viewer's phone number is dialed from a third party to the advertiser's phone number or the advertiser's phone number is dialed from a third party and then connected to the phone number which was entered into the box 101, which is the phone number of the person viewing the advertisement. The phone call between the ad viewer that put his/her phone number into the input field and the advertiser or the client of the advertisement owner is made using a click to call developers system such as Ifbyphone.com® to route the phone call. A viewer does not need to click through various web pages and does not need to input various other personal information. The phone number input field may pop up a format suggestion or check for correct format before submitting to the server. Thus, an ad viewer enters his or her phone number into the box 101 on the display advertisement and hits the call me button 103. Immediately upon hitting the call me button, the click to call developers system such as Ifbyphone.com®, a third party, initializes a call between the advertiser and the ad viewer.

Figure 2:
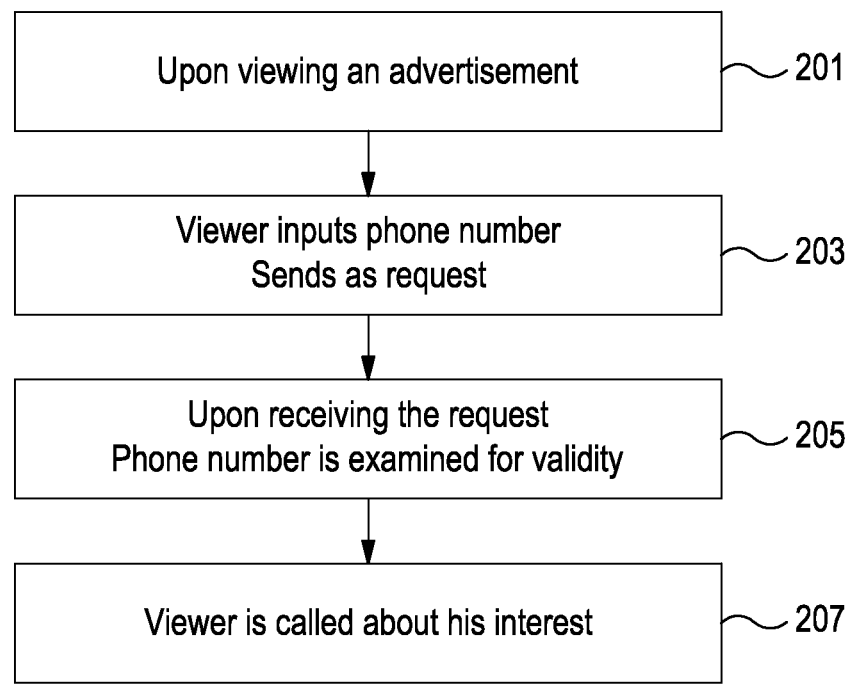
FIG. 2 shows a functional flow diagram performed by an internet banner advertising and its viewers.

In reference to FIG. 2, the interaction between ads viewer and ads placer is shown. At step 201, a viewer upon viewing the advertised information, becomes interested in knowing more information. At step 203, the interested viewer inputs its contacting phone number in the input form placed right at the banner advertisement and sends the request by clicking the "Call Me" button. At step 205, the server of the ads hosting agency receives the request, and a program is implemented to check the validity of the phone number. Alternatively, the advertiser of the banner ads directly receives the phone number which can be checked for validity at the choice of the advertiser. At step 207, the phone number is called either by the advertiser or its agents to answer any questions of the viewer.

This "click to call" display advertising may be featured with any sized banner display on the internet or wireless networks. The "click to call"

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method for interactive advertising, comprising:
   providing an advertising message comprising advertising content and a phone number input form field;
   receiving a phone number input into the phone number input form field by a viewer;
   submitting the received phone number to a server; and
   the server connecting a telephone call between an advertiser and the viewer using the submitted phone number,
   wherein the advertising message is provided within at least one of a banner advertisement in a web page, an in-text advertisement presented upon a mouse-over event and comprising a hyperlink in text of a web page, or a text message advertisement sent over a wireless network.

2. The method of claim 1, further comprising validating the submitted phone number.

3. The method of claim 1, wherein the using the submitted phone number to connect the call between the viewer and the advertiser is performed by an advertising agency.

4. The method of claim 1, wherein the using the submitted phone number to connect the call between the viewer and the advertiser is performed by the advertiser.

5. The method of claim 1, wherein the advertising message further comprises a submitting button, wherein the phone number input in the phone number input form field is submitted to the server by clicking on the submitting button.

6. The method of claim 1, wherein the advertising message is provided within the banner advertisement in the web page, and
   wherein the banner advertisement is a graphical advertisement embedded into the web page and comprises at least one of text, video, or rich media.

7. The method of claim 1, wherein the advertising message is provided within the text message advertisement sent over the wireless network.

8. The method of claim 1, wherein the advertising message is provided within the in-text advertisement presented upon the mouse-over event and comprising the hyperlink in text of the web page.

* * * * *